(12) United States Patent
Long

(10) Patent No.: US 11,229,101 B2
(45) Date of Patent: Jan. 18, 2022

(54) LED DRIVER AND LED LIGHTING SYSTEM FOR USE WITH A HIGH FREQUENCY ELECTRONIC BALLAST

(71) Applicant: SIGNIFY HOLDING B.V., Eindhoven (NL)

(72) Inventor: Huo Jun Hj Long, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/257,231

(22) PCT Filed: Jul. 1, 2019

(86) PCT No.: PCT/EP2019/067569
§ 371 (c)(1),
(2) Date: Dec. 30, 2020

(87) PCT Pub. No.: WO2020/007783
PCT Pub. Date: Jan. 9, 2020

(65) Prior Publication Data
US 2021/0176838 A1 Jun. 10, 2021

(30) Foreign Application Priority Data

Jul. 3, 2018 (WO) ................ PCT/CN2018/094298
Aug. 30, 2018 (EP) ..................................... 18191672

(51) Int. Cl.
*H05B 45/357* (2020.01)
*H05B 45/395* (2020.01)
*H05B 45/3725* (2020.01)

(52) U.S. Cl.
CPC ....... *H05B 45/357* (2020.01); *H05B 45/3725* (2020.01); *H05B 45/395* (2020.01)

(58) Field of Classification Search
CPC . H05B 45/357; H05B 45/395; H05B 45/3725
See application file for complete search history.

(56) References Cited

U.S. PATENT DOCUMENTS 9,341,359 B1 * 5/2016 Fernandez ......... H05B 45/3725
9,357,600 B2 * 5/2016 Tao ...................... H05B 45/357
(Continued)

FOREIGN PATENT DOCUMENTS

WO 2013024389 A1 2/2013
WO 2015193071 A1 12/2015
(Continued)

*Primary Examiner* — Borna Alaeddini
(74) *Attorney, Agent, or Firm* — Daniel J. Piotrowski

(57) ABSTRACT

A retrofit LED driver is for connecting to a high frequency ballast and for driving a LED load. A switch arrangement is used to couple the driver output power to the LED load or isolate the output power from the LED load. Voltage regulation is used when the output power is isolated from the LED load, and current regulation is used when the output power is coupled to the LED load. The voltage regulation is used so as to increase an output impedance as seen from the high frequency ballast by introducing an additional impedance of non-LED light source, when the output power coupled to the LED light source is less than a threshold, for example in deep dimming mode or standby mode instructed by the user. In this way, the effective impedance of the lamp is increased, which enables switching noise to be reduced, meanwhile the overall LED output power is not increased, as desired by the user.

13 Claims, 5 Drawing Sheets

(56) References Cited

U.S. PATENT DOCUMENTS

| | | | |
|---|---|---|---|
| 9,426,849 B2* | 8/2016 | Tao | H05B 45/36 |
| 10,136,486 B2* | 11/2018 | Segers | H05B 45/48 |
| 10,405,385 B2* | 9/2019 | Li | H05B 45/395 |
| 10,588,190 B2* | 3/2020 | Beij | H05B 45/14 |
| 10,904,972 B2* | 1/2021 | Chen | H05B 45/3725 |
| 2013/0221867 A1 | 8/2013 | Deppe et al. | |
| 2014/0084800 A1* | 3/2014 | Lee | H05B 45/37 315/200 R |
| 2014/0159592 A1* | 6/2014 | Pan | H05B 45/00 315/187 |
| 2014/0192526 A1* | 7/2014 | Qiu | H05B 45/00 362/218 |
| 2014/0203716 A1* | 7/2014 | Tao | H05B 45/44 315/186 |
| 2014/0203717 A1* | 7/2014 | Zhang | H05B 45/3578 315/188 |
| 2014/0225519 A1* | 8/2014 | Yu | H05B 45/3725 315/187 |
| 2014/0239834 A1* | 8/2014 | Choi | H05B 45/375 315/205 |
| 2015/0048746 A1* | 2/2015 | Park | H05B 45/39 315/187 |
| 2015/0181661 A1* | 6/2015 | Hsia | F21V 25/04 315/160 |
| 2015/0198290 A1* | 7/2015 | Segers | H05B 45/46 315/191 |
| 2016/0081147 A1* | 3/2016 | Guang | H05B 45/3578 315/123 |
| 2016/0174307 A1* | 6/2016 | Tao | H05B 45/3725 315/85 |
| 2018/0042075 A1* | 2/2018 | Welten | H05B 45/20 |
| 2018/0054863 A1 | 2/2018 | Hu et al. | |
| 2018/0112837 A1* | 4/2018 | Sadwick | H05B 45/3725 |
| 2018/0302963 A1* | 10/2018 | Fu | H05B 45/48 |
| 2018/0376557 A1* | 12/2018 | Beij | H05B 45/14 |
| 2021/0136893 A1* | 5/2021 | De Jongh | H05B 45/37 |

FOREIGN PATENT DOCUMENTS

| | | |
|---|---|---|
| WO | 2018054841 A1 | 3/2018 |
| WO | 2018162314 A1 | 9/2018 |

* cited by examiner

LED DRIVER AND LED LIGHTING SYSTEM FOR USE WITH A HIGH FREQUENCY ELECTRONIC BALLAST

CROSS-REFERENCE TO PRIOR APPLICATIONS

This application is the U.S. National Phase application under 35 U.S.C. § 371 of International Application No. PCT/EP2019/067569, filed on Jul. 1, 2019, which claims the benefit of International Application No. PCT/CN2018/094298, filed Jul. 3, 2018, which claims the benefit of European Patent Application No. 18191672.7, filed on Aug. 30, 2018. These applications are hereby incorporated by reference herein.

FIELD OF THE INVENTION

The present invention generally relates to the field of lighting and, more specifically, to a retrofit Light Emitting Diode, LED, lamp. The present invention further relates to a lighting system comprising a high frequency electronic ballast and the retrofit LED lamp, and to a method of operating a retrofit LED lamp.

BACKGROUND OF THE INVENTION

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED tube is typically adapted to fit into the socket of the respective lamp fixture to be retrofitted. Moreover, since the maintenance of a lamp is typically conducted by a user, the retrofit LED tube should ideally be readily operational with any type of suitable fixture without the need for re-wiring the fixture.

One of the drawbacks of the retrofit LED tube is that it does not function properly in case the LED tube also allows for dimming. One approach for implementing dimming is to use a so-called shunt switch. The shunt switch is used to bypass the LEDs when the switch is closed, in particular to reduce the LED voltage below the minimum LED string voltage.

The use of a shunt switch for implementing dimming of a retrofit LED lamp is for example disclosed in WO 2018/054841. The shunt switch is used to turn the LED lamp on and off.

However, some ballasts are not compatible with retrofit LED tubes, because the noise is too high during the off periods or the retrofit LED tube may not turn off correctly after a received off command.

WO2013024389A1 discloses a close loop regulation that cause the average LED power to equal to a target power level by controlling a duty cycle of shunting a LED load.

SUMMARY OF THE INVENTION

The inventor finds that the reason for the large amount noise is that when the LED load is small, for example in a turn off state or in a deep dimming state, the impedance as seen by the electronic ballast is too small. The ballast still needs a high impedance during the off period, but the switching times are too long to provide the required change in impedance to avoid noise. The reason some retrofit LEDs do not turn off is that the output current of the ballast is too high to reduce the LED voltage enough during the off period.

It would be desirable to reduce the audible noise caused by a high frequency electronic ballast in way which avoids the need for multiple additional passive components and thereby reduces the cost and complexity of the circuit.

It is a concept of the invention to provide a retrofit LED driver for connecting between a high frequency ballast and a LED light source, in which an output voltage is controlled so that an output impedance is regulated above a certain threshold which suits the ballast and prevents it from making noise, when the output power coupled to the LED light source is less than a threshold. This impedance increase may be used when the LED light source is to be turned off, or when it is to be driven to a deep dimming level. In both cases, noise is reduced.

The invention is defined by the claims.

According to the invention, there is provided a retrofit LED driver for connecting between a high frequency ballast and a LED light source, comprising:

a power conversion circuit which is arranged to receive AC power at its input from the high frequency ballast and, in use, to convert said AC power to an output power at a power terminal of the power conversion circuit for coupling to the LED light source, wherein the power conversion circuit is adapted to allow a current outputted by the high frequency ballast to flow to the power terminal;

a switch arrangement for coupling a part of the output power at the power terminal to the LED light source or isolating another part of the output power at the power terminal from the LED light source; and a regulation circuit for regulating a voltage at the power terminal so as to regulate an output impedance as seen from the high frequency ballast by introducing an additional impedance of non-LED light source, when the part of output power coupled to the LED light source is less than a threshold.

This driver provides a regulated (in particular increased) output impedance during a voltage regulation mode, in particular by increasing the output voltage at the power terminal. This voltage regulation is used when the power to the LED load is too small to suit the electronic ballast, for example when the output of the driver is isolated from the LED load (the LED light source) or when a low output power setting (i.e. a deep dimming level) is selected. It means that the effective impedance of the load is regulated to meet the ballast's requirements. In particular, the ballast output current is almost constant as result of the inductive nature of the ballast. Thus, the effect of the increased voltage is to increase the effective impedance of the driver. Thus, the invention provides a way to increase an effective impedance, with a circuit that can be implemented simply and with low cost. The increased impedance results in reduced noise.

In a mode wherein the LED needs to be completely turned off, like in standby of the lamp with no light emitted, the regulation circuit is for example adapted to regulate the voltage of the output power to be higher than a minimum conducting voltage of the LED light source, when the switch arrangement isolates the output power, at the power terminal, from the LED light source and the output power coupled to the LED light source is zero.

The driver thus provides an output voltage higher than the minimum conducting voltage, i.e. LED string voltage, during the voltage regulation mode, in particular when the LED light source is turned off. In other solutions, in order to isolate the output power from the LED, the output voltage is often decreased below the minimum conducting voltage while the LED is still connected at the output voltage. The LED is turned off since the voltage is not enough, but this also decreases the impedance as seen from the ballast and causes noise. This embodiment can mitigate this problem by using the switch arrangement to actively isolate the output power while still regulating the voltage of the output power at a voltage value higher than the minimum conducting voltage. The LEDs are guaranteed to be turned off and the noise is also reduced.

In a mode wherein a low current output is delivered to the LED to emit small amount of light, the switch arrangement is for example adapted to provide the additional impedance that adds up with an impedance of the LED light source as the output impedance above the value, when the output power coupled to the LED light source is less than a non-zero threshold but is more than zero.

This driver thus provides an increased output impedance not only when the LED light source is turned off, but also during a low lighting level. At this time, the switching arrangement does connect the output power top the LED light source, and provides an extra impedance. Since the power conversion circuit still delivers the low current output, the extra impedance consumes some power and makes the ballast operate in a comfort zone regarding its output impedance. Noise is still reduced, though there may be a little power loss but this power loss is acceptable in a dimming state.

In general, the regulation circuit is adapted to introducing the additional impedance of non-LED light sources thereby the retrofit LED driver maintaining an overall LED output power. Meaning that the LED driver does not change the its total LED output power, and the lamp is still in deep dimming mode or standby mode.

The switch arrangement may comprise a switch to be in series with the LED light source across the power terminal.

The switch thus couples or isolates the LED load. It may comprise any of a bipolar transistor and a power Metal Oxide Semiconductor, MOS, Field Effect Transistor, FET.

The driver preferably further comprises a buffer capacitor in parallel with the power terminal of the power conversion circuit. The buffer capacitor provides smoothing of the output voltage, and can also act as a load/impedance in case the LEDs are isolated.

The regulation circuit may then be adapted to regulate the voltage across the buffer capacitor to be higher than the minimum conducting voltage of the LED light source when the switch arrangement is open to isolate the output power at the power terminal from the LED light source.

This is a higher voltage than the alternative approach of ensuring the voltage drops below the LED string voltage. Noise is reduced compared with the alternative approach.

The regulation circuit may even be adapted to regulate the voltage across the buffer capacitor to be higher than a normal operating voltage of the LED light source. This is an even higher voltage, thereby having greater impact on the effective impedance.

The regulation circuit may further comprise a discharging circuit in parallel with the buffer capacitor, wherein when the switch arrangement switches from isolating the output power at the power terminal from the LED light source to coupling the output power at the power terminal to the LED light source, the regulation circuit is adapted to couple the discharging circuit to the buffer capacitor to discharge the buffer capacitor before coupling the output power to the LED light source.

This enables a rapid discharge of the buffer capacitor when the isolation of the LED load ends, namely when the voltage regulation ends so that current regulation can then commence. This can prevent an inrush/high current to the LED caused by a high voltage on the buffer capacitor, in the switching from the standby mode to the lighting mode, which may cause LED flicker or cause damage.

The switch arrangement may comprise a variable impedance to be in series the LED light source, the power conversion circuit is adapted to regulate the current to the LED light source at a current value below a current corresponding to the non-zero power threshold, and the switch arrangement is adapted to increase the variable impedance when the current value to the LED light source is below the current corresponding to the non-zero power threshold.

This ensures that during a deep dimming setting (low current level), a voltage of the output power is still high and the impedance/load as seen by the ballast is still high, and the ballast noise can be reduced, by introducing an additional impedance at that time. It has the effect of increasing the load voltage even during coupling of the output power to the LED load. Note that those skilled in the art are more encouraged to reduce power loss to improve efficiency, instead of allowing a power loss. Thus, those skilled in the art would not increase the variable impedance to reduce noise. This embodiment provides an alternative and non-obvious solution.

The variable impedance for example comprises a transistor operating in the linear region, the lamp driver comprises a current sensor for sensing the current flowing to LED light source, and the switch arrangement is adapted to increase the variable impedance when the sensed current value to the LED light source is below the current corresponding to the non-zero power threshold.

This provides one implementation of the variable impedance. The control loop for the variable impedance can be independent from the control loop of the power conversion circuit.

The power conversion circuit may comprise a shunt-switch conversion circuit comprising at least one shunt switch to selectively short circuit the AC power received at its input or allow the AC power received at its input to flow to the power terminal.

This shunt switching approach enables the amount of power delivered to the LED light source to be controlled at a frequency corresponding to the switching frequency of the high frequency ballast. The shunt switching approach does not involve a power storing and commutation element and is easy to build. Also the shunt switching approach connects the ballast directly (with no energy storing and discharging) to the power terminal, thus the ballast can see the voltage/impedance at the power terminal directly and can reduce noise more efficiently.

The power conversion circuit for example comprises a rectifier having an input and an output and a diode bridge circuit, wherein the at least one shunt switch is integrated into the diode bridge circuit or external to the diode bridge circuit.

The shunt switch may comprise one or more transistors which replace one or more diodes of the diode bridge circuit, and thereby provide an active switching function in place of a passive diode switching function. This can reduce a power loss on the rectifier diode.

It may instead be implemented as one or more transistors in parallel with one or more normal diodes of the diode bridge circuit. It may alternatively be external to the diode bridge circuit.

The at least one shunt switch for example comprises first and second transistors each in parallel with a respective diode of the diode bridge circuit.

The invention also provides a LED lamp comprising:
a driver as defined above; and
an LED array for receiving said output power and emitting light.

The lamp may for example comprise a tubular LED lamp for connection to a conventional fluorescent or HID ballast.

The invention also provides a lighting system, comprising:
a high frequency electronic ballast to be used with fluorescent lamps; and
a LED lamp as defined above connected to said high frequency electronic ballast.

The lamp is for example dimmable based on the control of the switch arrangement.

A method may also be provided of operating a retrofit LED lamp connected to a high frequency ballast, comprising:
receiving AC power from the connected high frequency ballast and converting said AC power to DC power and providing DC power to an LED light source of the lamp;
selectively coupling the output power to the output terminal or isolating the output power from the output terminal thereby to implement control of the light output from the LED light source;
when coupling the output power to the output terminal regulating a current of the output power; and
when isolating the output power from the output terminal regulating a voltage of the output power so as to increase an output impedance as seen from the high frequency ballast, when the output power coupled to the LED light source is less than a threshold.

The voltage of the output power may be regulated to be higher than a minimum conducting voltage of the LED light source, or even be higher than the full normal operating voltage of the LED light source, when the switch arrangement isolates the output power, at the power terminal, from the LED light source and the output power coupled to the LED light source is zero.

An impedance may be provided that adds up with an impedance of the LED light source as the increased output impedance, when the output power coupled to the LED light source is less than the non-zero threshold but is more than zero.

These and other aspects of the invention will be apparent from and elucidated with reference to the embodiment(s) described hereinafter.

BRIEF DESCRIPTION OF THE DRAWINGS

FIG. 2 shows one possible implementation of the approach shown generally in

FIG. 1;

DETAILED DESCRIPTION

The invention provides a retrofit LED driver for connecting to a high frequency ballast. A main power conversion circuit converts the power from the ballast to the an output power. A switch arrangement different from the power conversion circuit is used to couple the driver output power to the LED load or isolate the output power from the LED load. Current regulation is used when the output power is coupled to the LED load. Additionally or alternatively, a voltage regulation is used so as to regulate/increase a voltage of the output power thereby to increase an output impedance as seen from the high frequency ballast (above an impedance value), when the output power coupled to the LED light source is less than a threshold. The threshold may cover both zero power or small power situations. In this way, the effective impedance of the lamp is increased, which enables switching noise to be reduced.

In order to mitigate the noise issue and the off performance for such retrofit LED lamps, the applicant has considered the addition of a switched capacitor arrangement, which is switched to increase the impedance of the retrofit LED lamp and reduce the output current of the ballast during the off periods.

The use of a switchable capacitor arrangement reduces audible noise originating from the high frequency electronic ballast, which may arise at certain, low, dimming levels. However, there is an increase in circuit cost and complexity.

This first considered approach will be described with reference to FIG. 1, before the alternative approach for increasing the effective impedance, in accordance with the invention, is described.

Figure 1:
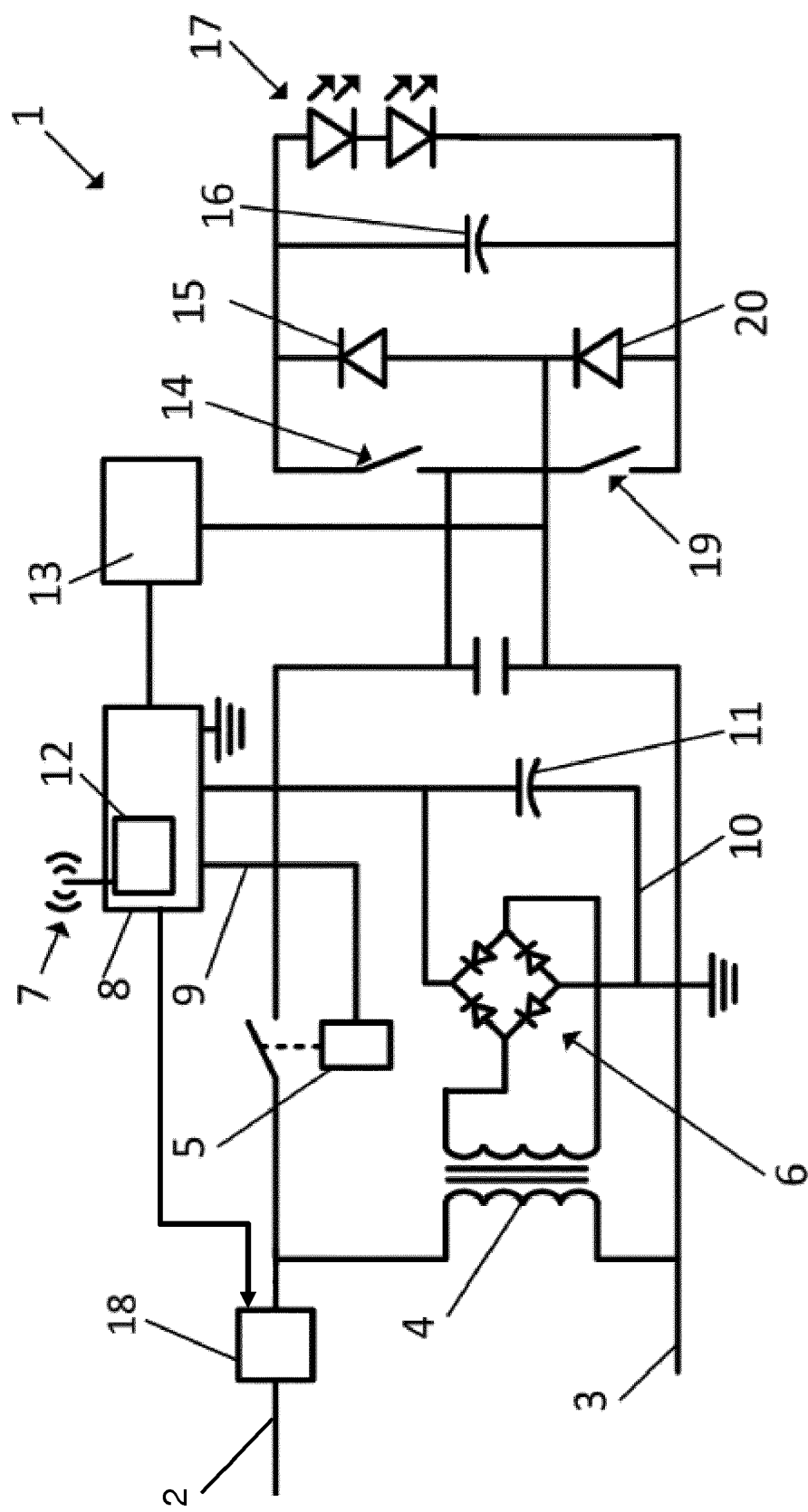
FIG. 1 shows an electrical circuit diagram of an example of a retrofit LED lamp as previously proposed by the applicant.

Reference numeral 1 in FIG. 1 designates a retrofit light emitting diode, LED, tube for a fluorescent tube. A LED tube is retrofitted when it fits in conventional armatures for fluorescent tubes, for example fluorescent tubes suitable for T5 or T12 fixtures. In order to fit these conventional armatures, the retrofit LED tube 1 comprises conducting pins for connecting, and supporting, the retrofit LED tube 1 in the conventional armatures.

The retrofit LED tube 1 comprises an LED array 17 for emitting light. The LED array 17 may comprise a plurality of series and parallel connected LEDs. Those skilled in the art will appreciate that in practical embodiments the LEDs are evenly distributed and spaced apart across the length of the tube 1, to provide for an evenly as possible lighting by the LED tube 1 over its entire length. The present disclosure is not limited to any specific type of LED, nor to any color LEDs. Typically, white colored LEDs are used.

The LEDs are powered through a rectifier having an input and an output, wherein the rectifier is arranged to receive an AC supply voltage at its input, from a connected HF ballast, in use, to convert the AC supply voltage to a DC voltage, and to provide the DC voltage to the LED array.

The rectifier is shown, in FIG. 1, using the two diodes indicated with reference numeral 15 and 20 in combination with the switches indicated with reference numeral 14 and 19. The rectifier is arranged to receive an AC supply voltage at its input, wherein the input is indicated with reference numerals 2 and 3. The main power supply which is arranged to provide that AC supply voltage is not a part of the retrofit LED tube 1 and is not shown in FIG. 1.

In the present example, the switches 14, 19 are directly controlled by a control unit 8. This implements a shunt switching approach. The working principle is as follows.

During a positive part of the AC supply voltage, the switch indicated with reference numeral 14 is closed allowing the current to flow through the switch 14, the LED array 17 and the dynamic capacitance 18 to the diode indicated with reference numeral 20. The diode 20 is in forward direction such that the current is able to flow through the diode 20 back to the input 3. In this case, the switch indicated with reference numeral 19 is opened.

During a negative part of the AC supply voltage, the switch indicated with reference numeral 19 is closed. The current then flows from the input 3 through the diode 15, which is in forward direction, the LED array 17, the switch 19 and the dynamic capacitance 18 back to the input indicated with reference numeral 2.

The rectifier shown in FIG. 1 thus operates according to the full wave rectification rectifying principle as it converts the whole of the AC supply voltage to one of constant polarity at its output.

Further, a synchronization circuit 13 is present for detecting the transitions of the AC supply voltage. That is, the synchronization circuit 13 is able to detect the current state of the AC supply voltage, i.e. whether the current state is positive or negative. This information is used, by the control unit 8, to correctly, and timely, control the switches indicated with reference numerals 14 and 19.

The control unit 8 is typically a microcontroller, a microprocessor, a Field Programmable Gate Array, FPGA, or anything alike. The synchronization circuit 13 is depicted as a stand-alone unit. However, the functionality of the synchronization circuit 13 may also be incorporated in the control unit 8 for efficiency purposes and for reducing the occupancy of physical space of the different electronic components.

In the present example, the retrofit LED tube 1 comprises a capacitor 16 at the output of the rectifier for smoothing out the DC supply voltage and for reducing any ripple current.

The retrofit LED tube 1 further comprises a dimming unit 12 for wirelessly receiving an input dimming level, and for dimming the emitted light by the LED array based on the received input dimming level. The dimming unit 12 may comprise an external, or internal, antenna 7 In order to be able to wirelessly receive the input dimming level. Typical transmission technologies that may be used for wirelessly transmitting the input dimming level comprise ZigBee™, Bluetooth™, WiFi based protocols, or any Mesh type of wireless network.

In the present example, the dimming unit 12 cooperates with the control unit 8 to realize the dimming effect. That is, the switches indicated with reference numeral 14 and 19 are controlled in such a way that they also provide for a dimming function.

That is, during a positive part of the AC supply voltage, the switch indicated with reference numeral 14 may not be closed while the switch 19 is closed during the whole positive part. Similarly, during a negative part of the AC supply voltage, the switch indicated with reference numeral 19 may not be closed while the switch 14 is closed during the whole negative part. Dimming is then realized by controlling the switches 14, 19.

A relay 5 may be provided in the AC supply voltage input 2 in order to turn-on and turn-off the LED array 17. The relay 5 may be controlled via the control unit 8.

In the present example, the control unit 8 is not powered by a separate battery, but is fed using the AC power. First, a galvanic isolation is provided using a transformer 4. A diode bridge 6 is connected to the second windings of the transformer for converting the AC supply voltage to a DC supply voltage. The DC supply voltage is stored in the capacitor 11. The capacitor 11 thus provides for DC power for empowering the control unit 8, the dimming unit 12 and, in some cases, the synchronization circuit 13. In this case, even if in standby state, the relay 5 cannot be completely off since the control unit 8 needs some power from the mains.

In FIG. 1, the feedback loop senses the LED current and adjusts the duty cycle of the shunt. The buffer capacitor drives the LEDs. The output of the HF ballast is a constant AC voltage at high frequency. The constant current will change in response to a change in the load presented to the ballast.

The present example is discussed with respect to an AC supply voltage of 230V, but may also operate in different kinds of AC supply voltages. Further, the present example is not limited to the specific rectifier or driver circuit as shown in FIG. 1. A skilled person is well aware of other types of rectifiers that are also suitable for empowering the LEDs in the LED array. It is also noted that different kinds of dimming principles exist to actually dim the LEDs in the LED array, all of which are suitable to be used.

A housing (not shown) may be provided for housing retrofit LED tube 1. More specifically, the housing may be arranged to house each of the components shown in FIG. 1. The housing may be a light transmissive housing or a partly light transmissive housing, configured as a retrofit tube type, for example.

The inventors have found that conventional high frequency ballast, more specifically the over-current functionality incorporated in the ballast, may cause audible noise. Audible noise is defined as noise perceivable to a human person.

In order to combat that phenomena, the inventors have previously proposed to introduce an (additional) dynamic impedance/capacitor in series with the output of the ballast such that the impedance seen by the ballast can be increased and such that the total current provided by the ballast can be controlled, i.e. reduced. It is thereby prevented that the ballast can get in an over-current situation.

In order to be able to control the output current of the ballast, this previously proposed approach is to use a dynamic capacitance 18 to implement the switch 5 in series with the output of the ballast, i.e. at the input of the rectifier. The dynamic capacitance 18 is arranged to introduce a capacitance in series with the output of the ballast, when connected.

The amount of capacitance, i.e. the capacitance value, provided by the dynamic capacitance is controlled by the control unit 8. The control unit 8 uses the received input dimming level for determining the capacitance value, and controls the dynamic capacitance 18 accordingly. As such, there is a direct relationship between the received input dimming level and the capacitance value of the dynamic capacitance. Note that the capacitance 18 may be bypassed if the LED output is high.

Figure 2:
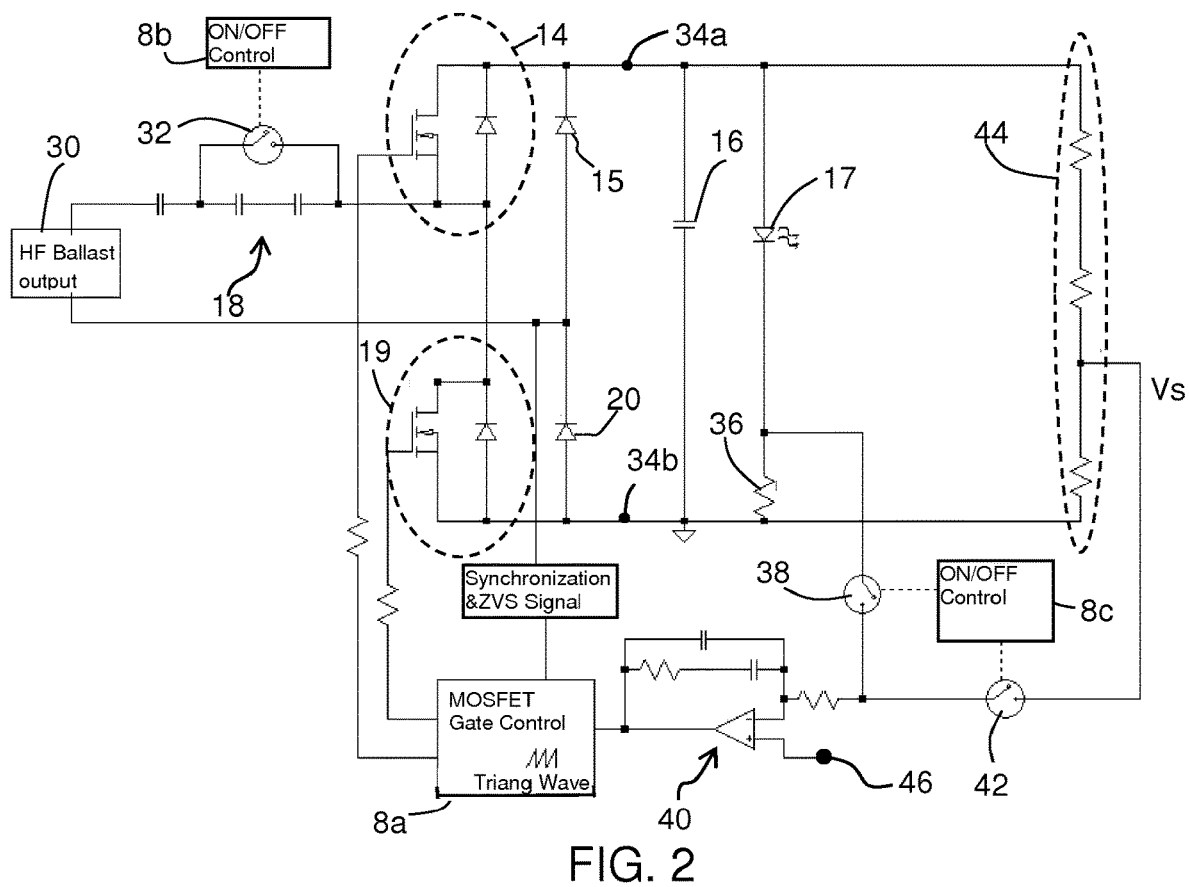

FIG. 2 shows a circuit implementation based on the use of a dynamic capacitance, as described above. FIG. 2 shows an approach in which a current regulating mode and a voltage regulating mode are provided. The current regulating mode is used when the LED array is coupled to the output power from the high frequency ballast and the voltage regulating mode is used when the LED array is isolated form the output power from the high frequency ballast.

The same references are used as in FIG. 1 for the same components.

The HF ballast output is shown as block 30. The dynamic capacitor arrangement 18 is in series with one output terminal from the HF ballast. There is a shorting switch 32 for shorting a bank of capacitors.

The switches 14 and 19 of the rectifier are shown implemented by a diode and shorting transistor in parallel. The diode could be the body diode of the transistor. For example, with switch 19 closed, during the positive half cycle of the input, the LED array 17 is bypassed because there is a conduction path from the positive input terminal through closed switch 19 and diode 20 to the negative input terminal. A similar conduction path exists from the negative input terminal to the positive input terminal when the switch 14 is closed.

In this way, the switches 14 and 19 implement the shunt switching. The rectifier functions as a power conversion circuit which is arranged to receive AC power at its input from the high frequency ballast and, in use, to convert said AC power to an output power at a power terminal of the driver for coupling to the LED array. The power terminal is shown as the pair of output ports 34a, 34b. The rectifier allows a current outputted by the high frequency ballast to flow to the power terminal 34a, 34b.

The shunt switching means that the output power at the power terminal either flows to the LED array 17 or else it is isolated from the LED array.

The controller 8 is shown in FIG. 2 as three separate elements 8a, 8b, 8c. The element 8a controls the switches 14, 19. The element 8b controls the dynamic capacitor arrangement 18. The controller part 8c functions as a mode selection unit.

For a current regulation mode of operation, a current sense resistor 36 is used to monitor the current flowing through the LED array 17. A switch 38 is closed during current regulation so that the current sense signal is provided to a comparator circuit 40 having a negative feedback loop, which then control generates an error signal as input to the controller part 8a. The controller part 8a generates a triangular waveform for controlling the switches 14, 19. The duty cycle of the switches controls the shunt switching function, so that the ratio is controlled between time periods of ballast output power coupling to the LED array and isolation of the ballast output power from the LED array. In case the current to the LED is required to be very small, the switch 32 may become open to switch the capacitance 18 in series connection with the ballast.

In case that the LEDs need to be turned off in a standby mode but a voltage across the buffer capacitor 16 is still required for standby use, a voltage regulating mode is provided, the switch 38 is open and the switch 42 is closed. The switch 42 couples a detected voltage Vs to the comparator circuit 40. The detected voltage Vs is obtained from a resistive divider 44. The feedback control then results in control of the shunt switching to ensure a voltage across the buffer capacitor 16 which is below the string voltage of the LED array 17 so that the LED array remains off but still available for MCU/RF circuit use.

The comparator circuit 40 has a reference input 46. During current control, this reference input provides a voltage which is selected in dependence on the desired dimming level/LED current, and the feedback control regulates the current to achieve the desired dimming level. During voltage control, the reference input is a value representative of the descried output voltage, and the feedback control regulates the output voltage.

Figure 3:
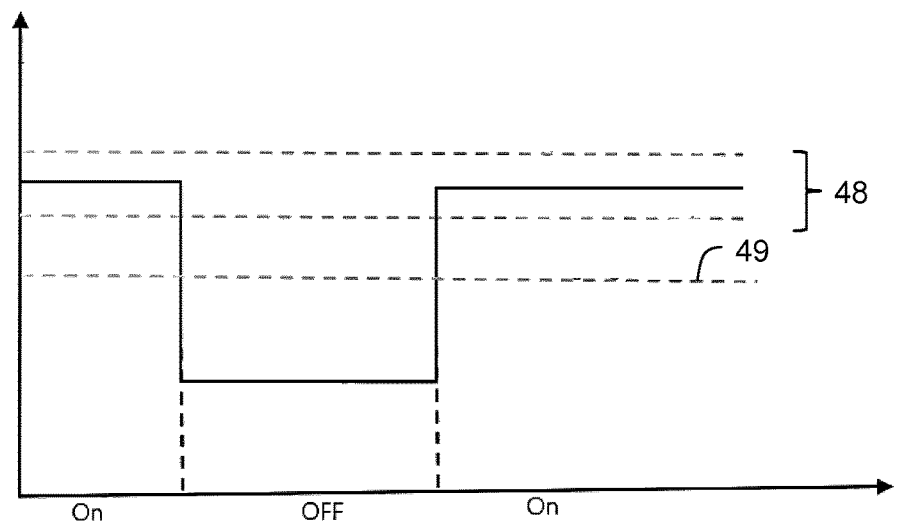
FIG. 3 is a timing diagram to explain the operation of the circuit of FIG. 2.

FIG. 3 shows the voltage across the buffer capacitor, and hence across the LED array (ignoring the small voltage drop across the current sense resistor). During the on time periods during which there is normal current control of the driving current to the LED array, the voltage is in the normal voltage range 48, above the LED array string voltage 49. During the off time periods, the voltage is below the LED array string voltage 49 in order to turn off the LED array.

During the on times, the switch 32 is closed and two capacitors of the dynamic capacitance 18 are shunted. The switch 38 is closed and switch 42 is open. The driver is operated with current control. During the off times, the switches 32 and 38 are open and switch 42 is closed. The driver operates a voltage control mode and the voltage on the buffer capacitor 16 reduces below the LED array string voltage. At the same, switch 32 is open and the capacitors are in series. This increases the impedance of the lamp and the ballast output current reduces. The ballast noise issue can be improved and a smart off function is realized.

However, it would be desirable to avoid the need for the switchable dynamic capacitor.

Figure 4:
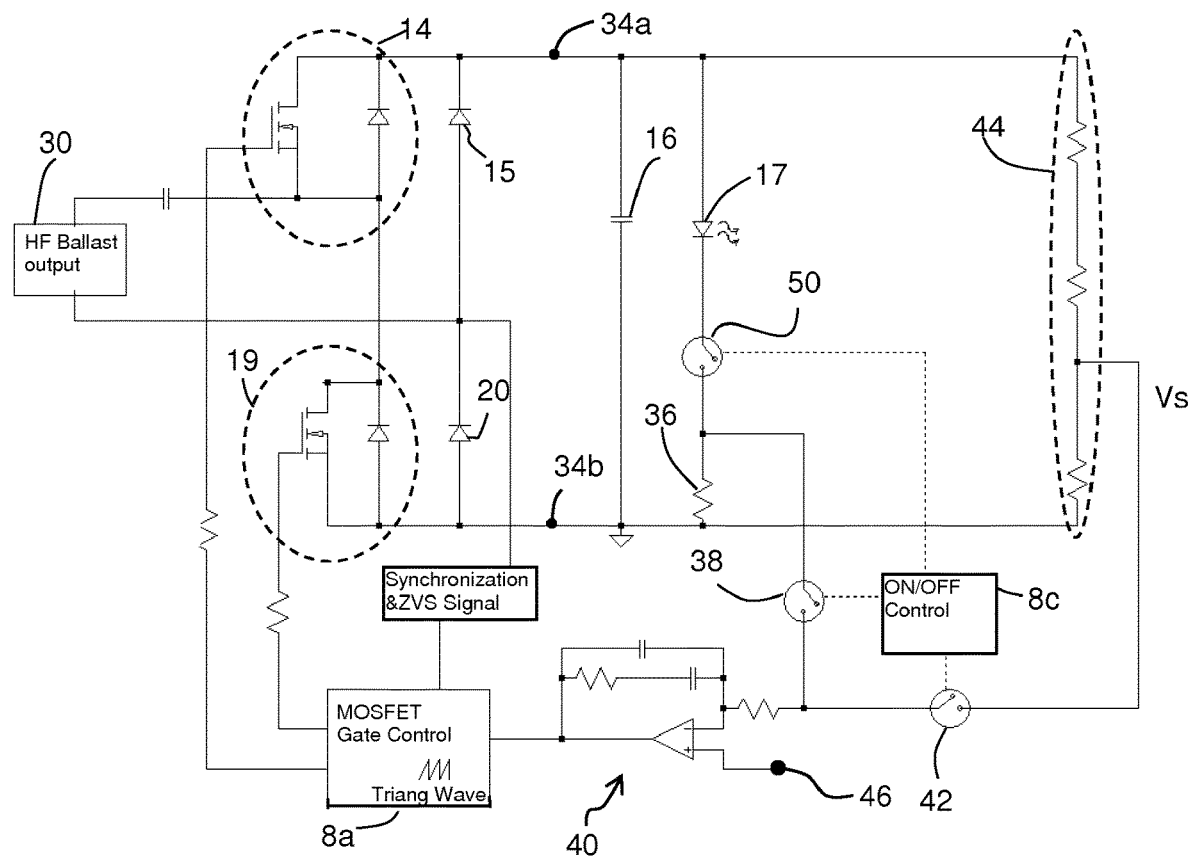
FIG. 4 shows a first example of a retrofit LED lamp.

The present application uses a switch arrangement at the output of the power conversion circuit. FIG. 4 shows a first example of a circuit in accordance with the invention. It is shown as a first modification to the circuit of FIG. 2, and it provides an alternative to the dynamic capacitance 18.

In addition to the removal of the dynamic capacitance, the circuit comprises a switch arrangement 50 for coupling the output power at the power terminal 34a, 34b to the LED array 17 or isolating the output power at the power terminal 34a, 34b from the LED array 17.

The switch arrangement for example comprises a transistor in series with the LED array 17 and the current sense resistor 36. It may comprise any of a bipolar transistor and a power Metal Oxide Semiconductor, MOS, Field Effect Transistor, FET.

By providing a switch, the voltage across the buffer capacitor does not need to drop below the LED string voltage in order to turn off the LED array 17. Instead, a higher voltage may be present on the buffer capacitor 16.

In this way, during voltage regulation, the output impedance as seen from the high frequency ballast may be increased by controlling the voltage level instead of using a dynamic capacitance.

As will be understood from the examples below, the impedance may be increased in general when the output power coupled to the LED array 17 is less than a threshold. For the circuit of FIG. 4, the threshold is zero, i.e. when no power is to be supplied to the LED array, the impedance is increased.

Figure 5:
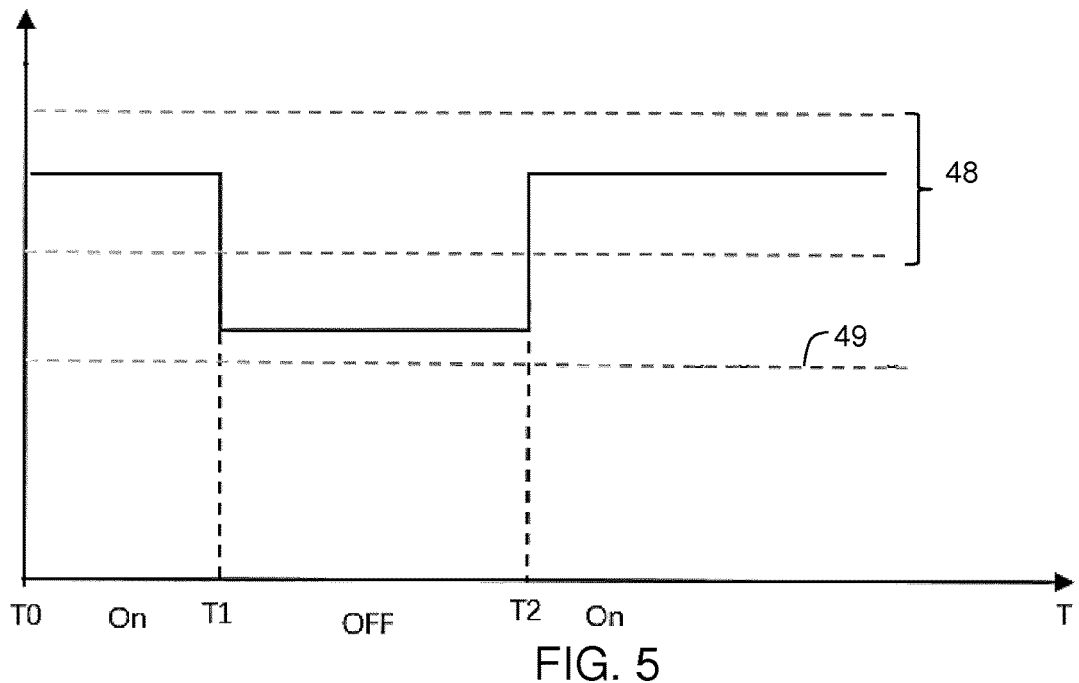
FIG. 5 is a timing diagram to explain the operation of the circuit of FIG. 4.

FIG. 5 shows the voltage across the buffer capacitor when the LED array is on (from time T0 to T1), off (from time T1 to T2) and on again (from time T2 onwards).

When the LED array is on, the switches 38 and 50 are closed and the switch 42 is open. The driver operates the current control mode. When an off command is received at time T1, the switches 38 and 50 are open and switch 42 is closed. The driver operates the voltage control mode.

The switching frequency of the switches 14 and 19 remains synchronized with the ballast output current, but the voltage on the buffer capacitor 16 is kept higher than the LED string voltage 49. The switch 50 is open so the LED array remains off.

The increased buffer capacitor voltage compared to the circuit of FIG. 2 during the off period means the output voltage of the ballast is increased. The ballast output current is almost constant, so this has the effect of increasing the impedance of the lamp. More specifically, the lamp's impedance should be adjusted to help to reduce the sub-harmonic oscillation of ballast output current. The ballast noise issue is thus improved.

When an on command is received at time T2, the switches 38 and 50 are again closed and the switch 42 is open.

The switch sequence is shown in Table 1 below

TABLE 1

|  | 50 | 42 | 38 |
|---|---|---|---|
| T0~T1 | close | open | close |
| T1~T2 | open | close | open |
| T2~ | close | open | close |

Thus, in this example the voltage regulation regulates the voltage of the output power to be higher than a minimum conducting voltage of the LED array, when the switch arrangement isolates the output power (at the power terminal 34a, 34b) from the LED array, and the output power coupled to the LED array is zero.

Figure 6:
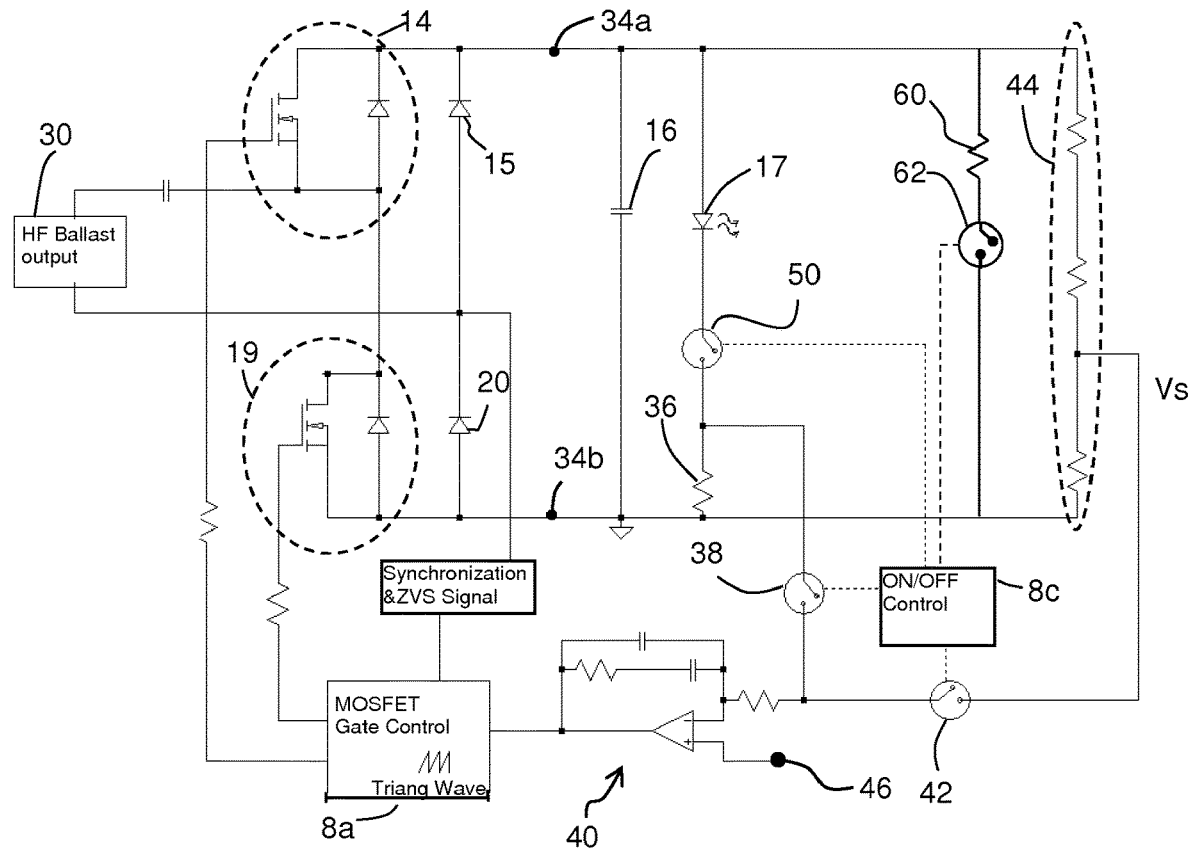
FIG. 6 shows a second example of a retrofit LED lamp.

FIG. 6 shows a second example of a circuit in accordance with the invention. It is shown as a modification to the circuit of FIG. 4.

In addition to the switch arrangement 50, there is a discharging circuit comprising a branch in parallel with the buffer capacitor 16, wherein the branch comprises a resistor 60 and a switch 62.

The purpose is to enable an even higher voltage across the buffer capacitor when the LED array is isolated. The discharging circuit enables that higher voltage on the buffer capacitor to be discharged without applying the higher voltage to the LEDs directly, as will be explained below. The switch is controlled by the controller.

Figure 7:
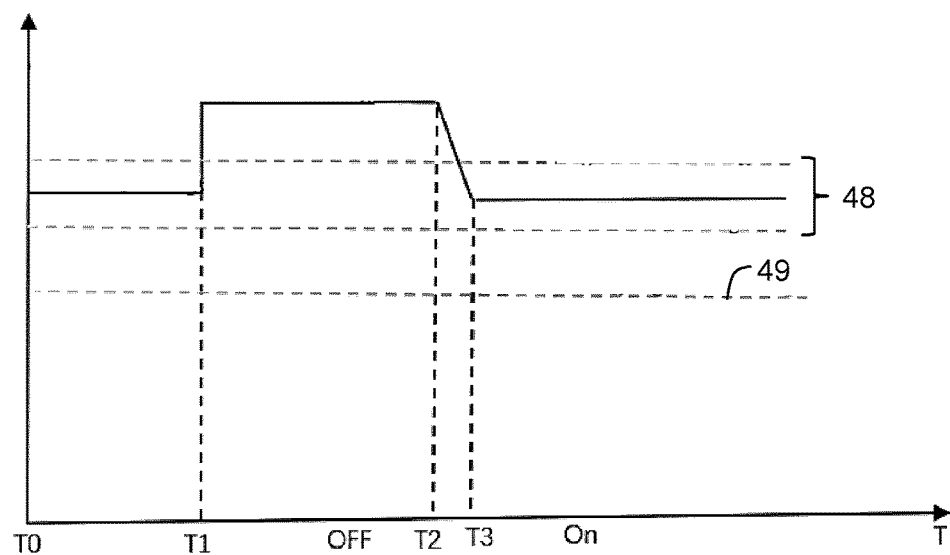
FIG. 7 is a timing diagram to explain the operation of the circuit of FIG. 6.

FIG. 7 shows the voltage across the buffer capacitor when the LED array is on (from time T0 to T1), off (from time T1 to T3), and on again (from time T3 onwards). The off period includes a transition time from T2 to T3.

This transition time is when the switch arrangement switches from isolating the output power at the power terminal from the LED array to coupling the output power at the power terminal to the LED array. During this time, from T2 to T3, the discharging circuit is coupled to the buffer capacitor to discharge the buffer capacitor before coupling the output power to the LED array at time T3.

This enables a rapid discharge of the buffer capacitor when the isolation of the LED load ends, namely when the voltage regulation ends so that current regulation can then commence.

When the LED array is on, the switches 38 and 50 are closed and the switches 42 and 62 are open. The driver operates the current control mode as described above. When the off command is received at time T1, the switches 38, 50 and 62 are open and switch 42 is closed. The driver operates the voltage control mode as described above, and again the frequency is synchronized with the ballast output current.

The voltage on the buffer capacitor is now above the normal operating voltage range 48, namely above the 100% LED output level. The switch 50 means the LED array is still off. The impedance of the lamp is even higher and the ballast noise issue can be improved further.

At time T2, the on command is received. The switches 42 and 50 are open, and the switches 38 and 62 are closed. The load 60 is used to discharge the buffer capacitor 16. The LED array remains off because the switch 50 is still open. At time T3, the voltage on the buffer capacitor has dropped below the maximum LED string voltage to the normal operating level 48. The switch 62 is then opened and switch 50 is closed. The driver operates the current control mode.

The switch sequence is shown in Table 2.

TABLE 2

|  | 50 | 42 | 38 | 62 |
|---|---|---|---|---|
| T0~T1 | close | open | close | open |
| T1~T2 | open | close | open | open |
| T2~T3 | open | open | close | close |
| T3~ | close | open | close | open |

Experiments have been conducted to demonstrate the technical effect of noise reduction. The ballast is a commerically available ballast (part number ICN-2P32-N), the LED has a minimum forward voltage of 90V, and the normal operating voltage is 110V.

The results are as follows:

|  | Output voltage | Noise |
|---|---|---|
| Embodiment of FIG. 1 or 2 | 50 V | 20.5 dB |
| Embodiment of FIG. 4 | 96 V | 18.9 dB |
| Embodiment of FIG. 6 | 120 V | 18.1 dB |

These experiments show that the noise is reduced substantially.

Figure 8:
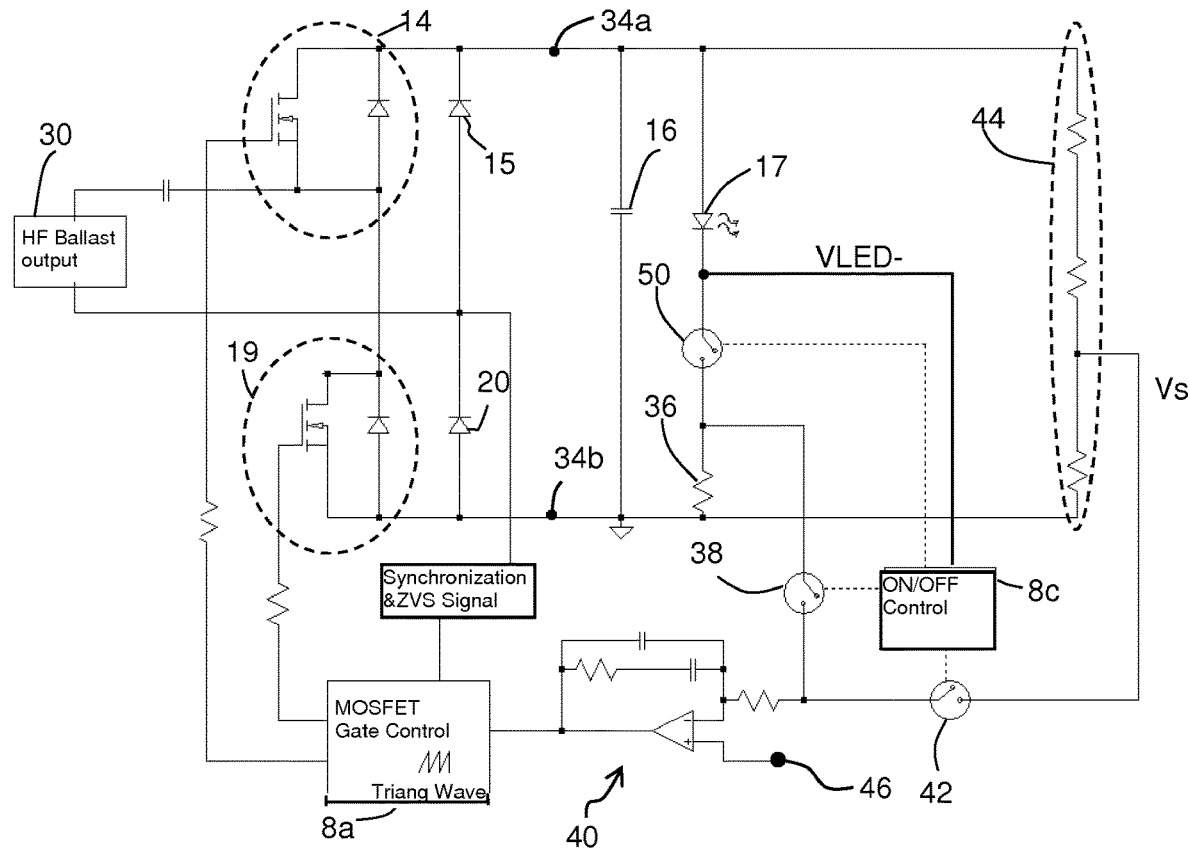
FIG. 8 shows a third example of a retrofit LED lamp.

FIG. 8 shows a third example of a circuit in accordance with the invention. It is shown as a modification to the circuit of FIG. 4.

The switch arrangement 50 in this example is adapted to have a controllable impedance/resistance. Its impedance adds up with the impedance of the LED array to contribute to the output impedance as seen by the ballast.

When the output power coupled to the LED array is less than a non-zero threshold but is more than zero, the impedance of the switch arrangement 50 is increased. This increased impedance is thus not only when the LED array is turned off, but also during a low lighting level. At this time, the switching arrangement does connect the output power to the LED array, but a low current output is delivered. This low current output is still provided by the power conversion circuit/shunt circuit. Compared with an implementation wherein the switch arrangement 50 is fully conductive, the duty cycle of the shunting should be lower so as to inject this low current into the LEDs 17 and the switch arrangement 50.

This ensures that during a deep dimming setting (low current level), the ballast noise can be reduced, by introducing an additional impedance at that time. It has the effect of increasing the load voltage even during coupling of the output power to the LED load.

The variable impedance of the switch arrangement 50 may be implemented by providing a transistor operating in the linear region. The voltage VLED− at the negative LED array terminal is sensed, and provided to the controller.

Figure 9:
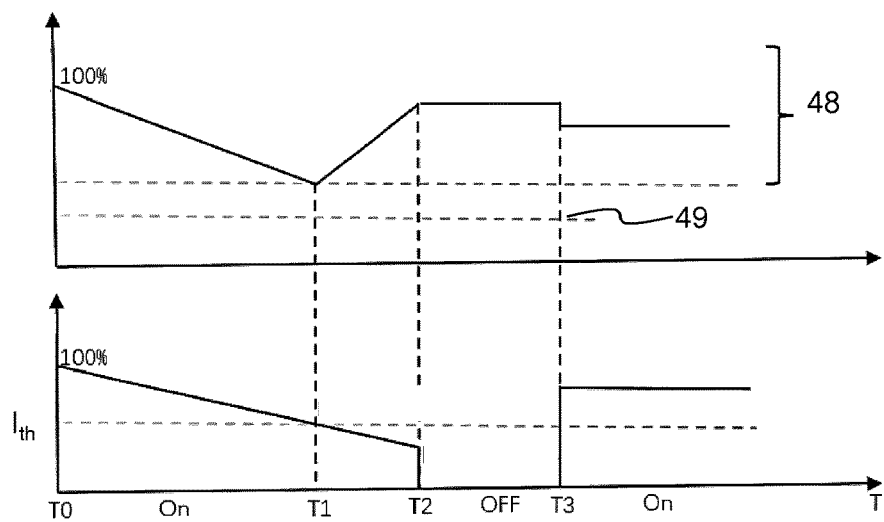
FIG. 9 is a timing diagram to explain the operation of the circuit of FIG. 8 in the procedure of dimming.

FIG. 9 in the top plot shows the voltage across the buffer capacitor/power terminal when the LED array is on (from time T0 to T2), off (from time T2 to T3) and on again (from time T3 onwards). The initial on period shows a linear decrease in light output setting (i.e. a progressively deeper dimming level). The dimming level between times T1 and T2 may be considered to be a deep dimming stage.

The bottom plot in FIG. 9 shows the LED array current which decreases to provide the linear decrease in light output setting.

The voltage drops from time T0 to T1 as a result of the reduced current. Note that change of the output voltage is only schematic and it could also be non-linear. The voltage drop depends on the LED forward voltage.

At high output levels, the switches 38 and 50 are closed and the switch 42 is open. The driver operates the current control mode exactly as described above. The resistance of the switch arrangement 50 is very low.

However, at time T1 when the LED array current is dimmed to below a threshold value (as sensed by the current sense resistor 36, shown as current $I_{th}$), the lamp enters a deep dimming operation mode at time T1 and the resistance of the switch arrangement 50 is changed to a high value, but it is not infinitely high (i.e. open circuit).

The current control based on the current sensor resistor 36 remains active so that the desired light output is still obtained, based on the control of the shunt rectifier circuit. The increased impedance is presented by the switch arrangement 50 with the result that the voltage increases. The higher impedance of the switch arrangement 50 only causes the output voltage to be higher than the normal corresponding LED operating voltage, thereby to increase the impedance as seen by the ballast so as to reduce noise.

The VLED− signal that is present across the switch arrangement 50 is used as a control parameter to control the impedance of the switch arrangement 50 to keep the voltage VLED− voltage above a certain value during the deep dimming. The voltage could be controlled as constant value that is high enough to provide the impedance, or as an increasing value as the LED current decreases.

The voltage across the current sense resistor 36 is dropping between times T1 and T2, and the voltage across the resistor 36 and switch arrangement 50 is made equal to the set value of VLED−. For example, this means the voltage across the switch arrangement 50 is increasing (despite the falling current). This corresponds to an increase in the impedance of the switch arrangement 50. Thus, the combination of voltage control and current regulation ensures the impedance of the switch arrangement increases as desired.

During the deep dimming status, the at time T2, the off commend is given, the switches 38 and 50 are open and the switch 42 is closed. This provides the same voltage control mode as described above.

The switch sequence is shown in Table 3.

TABLE 3

|  | 50 | 42 | 38 |
|---|---|---|---|
| T0~T1 | close | open | close |
| T1~T2 | Close/high resistance | open | close |
| T2~T3 | open | close | open |
| T3~ | close | open | close |

The HF ballast output should is typically cycling at hundreds of KHz. The shunt switch may be switched per half cycle, per cycle, or across multiple cycle. The timing diagrams above are over the long term, for example of the order of seconds.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit LED driver for connecting between a high frequency ballast and a LED light source, comprising:
a power conversion circuit which is arranged to receive AC power at its input from the high frequency ballast and, in use, to convert said AC power to an output power at a power terminal of the power conversion circuit for coupling to the LED light source, wherein the power conversion circuit is adapted to allow a current outputted by the high frequency ballast to flow to the power terminal;
a buffer capacitor in parallel with the power terminal of the power conversion circuit and the LED light source;
a switch arrangement for coupling the output power at the power terminal to the LED light source or isolating the output power at the power terminal from the LED light source; and
a regulation circuit for regulating a voltage at the power terminal so as to increase an output impedance as seen from the high frequency ballast by introducing an additional impedance, when the output power to be coupled to the LED light source is less than a threshold, characterized in that the regulation circuit is adapted to introduce the additional impedance by regulating the voltage across the buffer capacitor to be higher than the minimum conducting voltage of the LED light source when the switch arrangement is open to isolate the output power at the power terminal from the LED light source.

2. The retrofit LED driver according to claim 1, wherein the regulation circuit is adapted to regulate the voltage of the output power to be higher than a minimum conducting voltage of the LED light source, when the switch arrangement is adapted to isolate the output power, at the power terminal, from the LED light source and the output power coupled to the LED light source is zero.

3. The retrofit LED driver according to claim 1, wherein the switch arrangement is adapted to provide the additional impedance that adds up with an impedance of the LED light source as the increased output impedance, when the output power coupled to the LED light source is less than a non-zero threshold but is more than zero, and
the regulation circuit is adapted to introducing the additional impedance of non-LED light sources thereby the retrofit LED driver maintaining an overall LED output power.

4. The driver as claimed in claim 3, wherein:
the switch arrangement comprises a variable impedance to be in series with the LED light source;
the power conversion circuit is adapted to regulate the current to the LED light source at a current value below than a current (Ith) corresponding to the non-zero threshold; and
the switch arrangement is adapted to increase the variable impedance when the current value to the LED light source is below the current (Ith) corresponding to the non-zero threshold.

5. The driver as claimed in claim 4, wherein:
the variable impedance comprises a transistor operating in the linear region; and
the lamp driver comprises a current sensor for sensing the current flowing to LED light source, and the switch arrangement is adapted to increase the variable impedance when the sensed current value to the LED light source is below the current (Ith) corresponding to the non-zero threshold.

6. The driver as claimed in claim 1, wherein the switch arrangement comprises a switch to be in series with the LED light source across the power terminal.

7. The driver as claimed in claim 1, wherein the regulation circuit is adapted to regulate the voltage across the buffer capacitor to be higher than a normal operating voltage of the LED light source.

8. A driver as claimed in claim 7, wherein the regulation circuit further comprises a discharging circuit in parallel with the buffer capacitor, wherein when the switch arrangement switches from isolating the output power at the power terminal from the LED light source to coupling the output power at the power terminal to the LED light source, the discharging circuit is adapted to couple the discharging circuit to the buffer capacitor to discharge the buffer capacitor before coupling the output power to the LED light source.

9. The driver as claimed in claim 1, wherein the power conversion circuit comprises a shunt-switch conversion circuit comprising at least one shunt switch to selectively short circuit the AC power received at its input or allow the AC power received at its input to flow to the power terminal.

10. The driver as claimed in claim 9, wherein the power conversion circuit comprises a rectifier having an input and an output and a diode bridge circuit, wherein the at least one shunt switch is integrated into the diode bridge circuit or external to the diode bridge circuit.

11. The driver as claimed in claim 10, wherein the at least one shunt switch comprises first and second transistors each in parallel with a respective diode of the diode bridge circuit.

12. A LED lamp comprising:
the driver as claimed in claim 1; and
an LED light source for receiving said output power and emitting light.

13. A lighting system, comprising:
a high frequency electronic ballast to be used with fluorescent lamps; and
the LED lamp as claimed in claim 12 connected to said high frequency electronic ballast.

* * * * *